United States Patent [19]

Inaga

[11] 3,819,131

[45] June 25, 1974

[54] TAPE CASSETTE

[76] Inventor: Katsu Inaga, 1047 Karasuyama-machi, Setagaya-ku, Tokyo, Japan

[22] Filed: Nov. 3, 1971

[21] Appl. No.: 195,393

Related U.S. Application Data

[63] Continuation-in-part of Ser. No. 170,214, Aug. 9, 1971, Pat. No. 3,735,939.

[52] U.S. Cl. ................................ 242/199, 242/68.3
[51] Int. Cl. ........................ G11b 23/10, G11b 15/32
[58] Field of Search ........... 242/199, 200, 198, 197, 242/68.3

[56] References Cited

UNITED STATES PATENTS

| | | | |
|---|---|---|---|
| 1,014,962 | 1/1912 | Fox | 242/68.3 |
| 2,503,756 | 4/1950 | Mihalyi | 242/68.3 |
| 3,075,717 | 1/1963 | Kingston | 242/200 |
| 3,191,881 | 6/1965 | Campbell, Jr. et al. | 242/206 |
| 3,265,317 | 8/1966 | Liang et al. | 242/198 X |

*Primary Examiner*—George F. Mautz
*Attorney, Agent, or Firm*—Lewis H. Eslinger, Esq.; Alvin Sinderbrand, Esq.

[57] ABSTRACT

In a tape cassette adapted for use with a tape recording and/or reproducing apparatus having at least one reel shaft, the casing of the cassette has an aperture through which the reel shaft can extend into a coaxial socket opening at one end of a respective reel rotatably disposed within the casing, and the socket has an end wall surface remote from its open end and engageable by an end surface of the reel shaft, such end wall surface being at a greater axial distance from the open end of the socket than is the plane of the longitudinal median of the tape wound on the reel so that tension in the tape, when being wound or unwound on the reel, does not tend to withdraw the reel from the reel shaft or to tilt the reel relative to the reel shaft.

1 Claim, 3 Drawing Figures

INVENTOR
KATSU INAGA
BY
ATTORNEY

TAPE CASSETTE

This application is a continuation-in-part of may copending application Ser. No. 170,214, filed Aug. 9, 1971, now U.S. Pat. No. 3,735,939.

This invention relates generally to tape cassettes, and more particularly is directed to improvement in tape cassettes of the type in which a magnetic tape is wound on at least one rotatable reel contained in a casing or housing which is positionable on a recording and/or reproducing apparatus having a reel shaft engageable with the reel for controlling the rotation thereof.

In existing tape cassettes of the type described above, the bottom wall of the casing has an aperture centered with respect to each tape reel to receive the respective reel shaft of the recording and/or reproducing apparatus with which the cassette is to be used, and each reel and the respective reel shaft are provided with cooperatively engageable coupling elements located at or near the bottom of the reel for transmitting rotational forces between the tape reel and reel shaft. By reason of such location of the coupling elements, tension in the tape, when being wound or unwound with respect to the reel, acts at a level above the coupling elements and tends to lift and tilt the reel so as to either disengage the reel from its shaft or separate the coupling elements, or to tilt the reel relative to the shaft so that the reel rotates in an unstable or fluctuating manner.

Accordingly, it is an object of this invention to provide a tape cassette of the described character in which each tape reel thereof is designed, particularly with respect to its engagement with the associated reel shaft of a recording and/or reproducing apparatus, so that the reel will be subjected to stable rotation during the winding or unwinding of tape thereon.

A further object is to provide a tape cassette, as aforesaid, in which, during winding and unwinding of tape on each reel, there will be no tendency for the reel to either lift or tilt with respect to the associated reel shaft, and hence no tendency for the reel to either be disengaged from the reel shaft or to cause separation of the coupling elements by which the reel shaft and reel are rotatably coupled.

In accordance with an aspect of this invention, in a tape cassette adapted for use with a recording and/or reproducing apparatus having at least one reel shaft, the casing of the cassette has an aperture through which the reel shaft can extend into a coaxial socket opening at one end of the respective reel rotatably disposed within the casing, and the socket has an end wall surface remote from its open end and engageable by an end surface of the reel shaft, such end wall surface being at a greater axial distance from the open end of the socket than is the plane of the longitudinal median of the tape wound on the reel so that tension in the tape, when being wound or unwound on the reel, does not tend to withdraw the reel from the reel shaft or to tilt the reel relative to the reel shaft. In accordance with a further feature of this invention, the engageable coupling elements for rotatably coupling the reel with the associated reel shaft are provided at the aforesaid end wall surface of the socket and at the end surface of the reel shaft engageable therewith so that the force resulting from tension in the tape will act in a plane that is between the location of the engaged coupling coupling elements and the open end of the socket to avoid separation of the coupling elements.

The above, and other objects features and advantages of this invention, will be apparent in the following detailed description of an illustrative embodiment thereof which is to be read in connection with the accompanying drawing, wherein.

Figure 1:
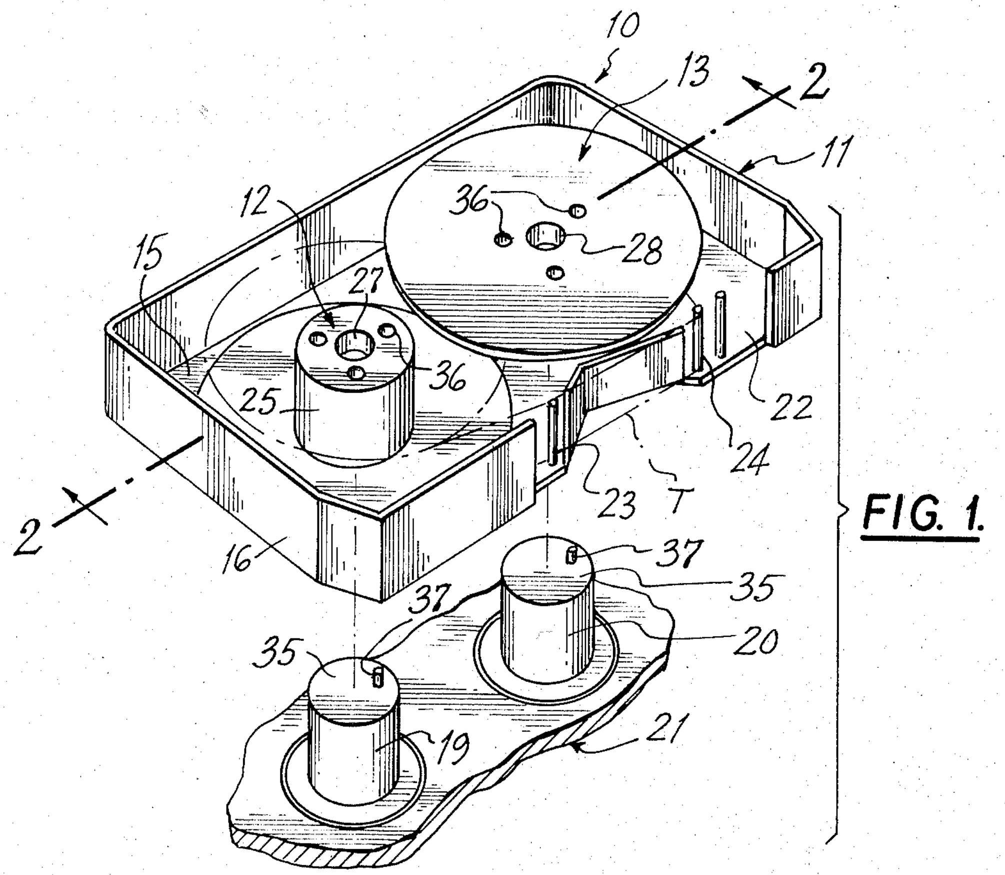
FIG. 1 is a perspective view of a tape cassette in accordance with an embodiment of this invention, shown with the top wall of its casing removed, and of a portion of a recording and/or reproducing apparatus with which the tape cassette is to be used.

Referring to the drawing in detail, it will be seen that the present invention is there shown embodied in a tape cassette 10 that generally comprises a casing 11, and rotatable tape supply and take-up reels 12 and 13 disposed in side-by-side relation within casing 11.

Casing 11 is shown to include generally rectangular, parallely spaced apart top and bottom walls 14 and 15, and a side wall 16 extending between the top and bottom walls along a substantial portion of the casing perimeter. Bottom wall 15 is shown to have spaced apart apertures 17 and 18 therein (FIG. 2) for receiving reel shafts 19 and 20, respectively, which project upwardly from a tape recording and/or reproducing apparatus 21 with which the cassette 10 is to be used. An opening or gap 22 (FIG. 1) is provided in side wall 16 along one of the longitudinal edges of casing 11, and guide pins 23 and 24 extend between top and bottom walls 14 and 15 adjacent such gap 22 for guiding a run of the tape T (shown in broken lines on FIG. 1) between reels 12 and 13 on which the tape is wound, so that such run of the tape will be exposed at gap 22. The apparatus 21, which forms no part of the present invention may be of the type disclosed in detail in U.S. Patent Application Ser. No. 37,623, filed May 15, 1970, and having a common assignee herewith, and in which devices (not shown) are engageable with the exposed run of the tape T for withdrawing the latter from casing 11, for example, so as to load the withdrawn tape around a rotary magnetic head assembly (not shown).

Figure 2:
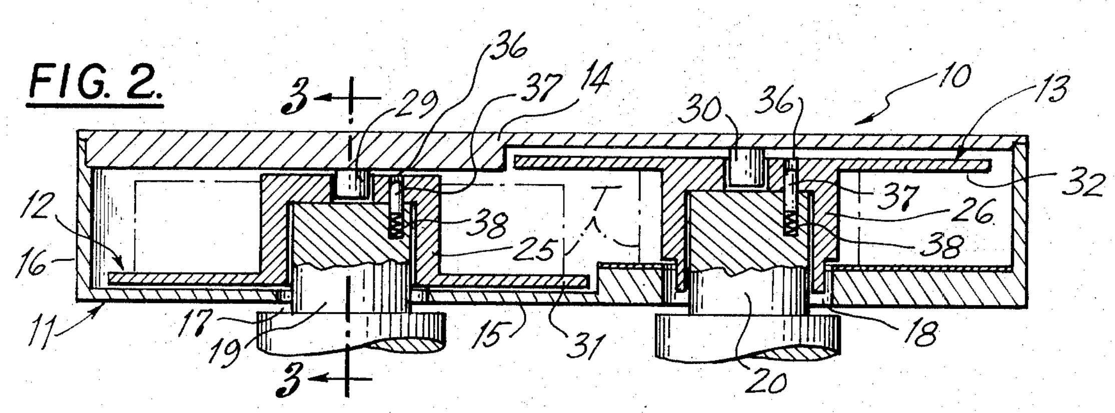
FIG. 2 is an enlarged sectional view taken along the line 2—2 on FIG. 1, and with the cassette shown in its operative position on the recording and/or reproducing apparatus.

The supply and take-up reels 12 and 13 are respectively shown to include generally cylindrical hubs 25 and 26 having axial bores 27 and 28 opening at the upper ends of the respective hubs for loosely receiving pins or stub shafts 29 and 30, respectively, which depend from top wall 14 and may be formed integral with the latter (FIG. 2). The bores 27 and 28 respectively cooperate with pins 29 and 30 to loosely hold reels 12 and 13 in alignment with apertures 17 and 18 in bottom wall 15 while permitting free rotation of the reels within casing 11. Further, reels 12 and 13 have radially extending flanges 31 and 32 which, as shown, may be provided only at the bottom and top, respectively, of hubs 25 and 26 so that the reels may be laterally located with their flanges 31 and 32 in overlapping relation.

Figure 3:
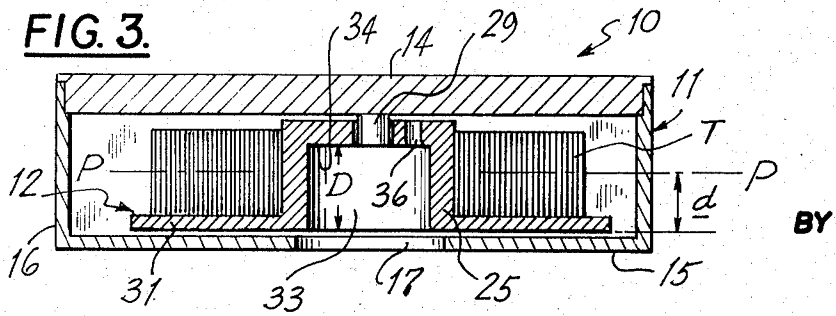
FIG. 3 is a sectional view taken along the line 3—3 on FIG. 2, but with the tape cassette removed from the recording and/or reproducing apparatus.

As shown particularly on FIG. 3 with reference to the hub 25 of reel 12, each of the reel hubs has a coaxial socket 33 opening at one end, that is, at the lower end, as shown, in registration with the respective aperture 17 and 18 for receiving the reel shaft 19 or 20 projected upwardly through such aperture when the cassette 10 is mounted on apparatus 21. The other or upper end of each socket 33 has an end wall surface 34 engageable by an end surface 35 of the shaft 19 or 20 inserted in the socket. Further, each of the reels 12 and 13 and the respective reel shaft 19 or 20 have cooperatively engageable coupling means located at end wall surface 34 of the respective socket 33 and at end surface 35 of the reel shaft 19 or 20 for rotatably coupling the reel with the respective reel shaft when cassette 10 is installed on recording and/or reproducing apparatus 21. In the illustrated example, such coupling means is constituted by one or more angularly spaced bores 36 formed in the upper portion of each of the hubs 25 and 26 at radial distances from the axis of the latter and opening at end wall surface 34 of the respective socket 33 to receive a coupling pin 37 (FIGS. 1 and 2) which is urged to project upwardly from the end surface 35 of the respective reel shafts 19 or 20, as by a spring 38 (FIG. 2).

In accordance with this invention, each socket 33 is axially dimensioned so that the distance D from its end wall surface 34 to its open end (FIG. 3) will be substantially greater than the distance *d* from the plane P—P of the longitudinal median of the tape T wound on the respective reel to the end of the reel at which the socket 33 opens. Thus, in the case of sockets 33 opening downwardly, as in the illustrated embodiment, end wall surface 34 at the top of each socket is disposed substantially above the plane P—P of the longitudinal median of the tape wound on each reel. Similarly, the engageable bores 36 and pins 37 constituting the means for rotatably coupling reels 12 and 13 with the respective reel shafts 19 and 20 are disposed at a level substantially above the plane P—P.

By reason of the foregoing arrangement according to this invention, when the tape T is being wound and unwound on reels 12 and 13, tension in the intermediate run of tape T, which may be represented by a force concentrated at the longitudinal median of the tape, acts below the engaged surfaces 34 and 35 and also below the engaged coupling elements 36 and 37. Thus, the tension in the tape being wound or unwound does not tend to lift the reel 12 or 13 relative to the shaft 19 or 20, thereby avoiding possible disengagement of the coupling elements 36 and 37, and further avoiding tilting of the reel 12 or 13 with respect to the reel shaft so that the winding or unwinding is achieved with stable and balanced rotation of the reels on the respective reel shafts.

Although an illustrative embodiment of this invention has been described in detail herein with reference to the accompanying drawing, it is to be understood that the invention is not limited to that precise embodiment, and that various changes and modifications may be effected therein by one skilled in the art without departing from the scope or spirit of the invention.

What is claimed is:

1. In combination with a tape recording and/or reproducing apparatus having at least one reel shaft, a tape cassette for use with said apparatus comprising a casing positionable on said apparatus, at least one reel rotatably contained in said casing and a tape wound on said reel for the recording and/or reproducing of signals on said tape by said apparatus, said casing having an aperture centered with respect to said reel for the projection therethrough of said reel shaft into said casing, said reel having a socket coaxial therewith and opening at one end in registration with said aperture for relatively closely receiving the reel shaft projected through the latter, said socket having an end wall surface at its other end engageable by an end surface of the shaft, said end wall surface of the socket being at a greater distance from said one end of the socket than is the plane of the longitudinal median of said tape wound on said reel, and cooperatively engageable means in said end wall surface of the socket and projecting axially from said end surface of the reel shaft, respectively, and being spaced radially from the axes of the shaft and socket for rotatably coupling said reel with said shaft.

* * * * *